J. C. HAUGHY.
SPRING WHEEL.
APPLICATION FILED AUG. 1, 1917.
1,283,407.
Patented Oct. 29, 1918.
2 SHEETS—SHEET 2.
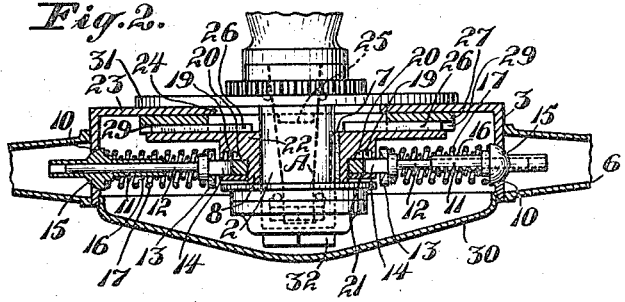
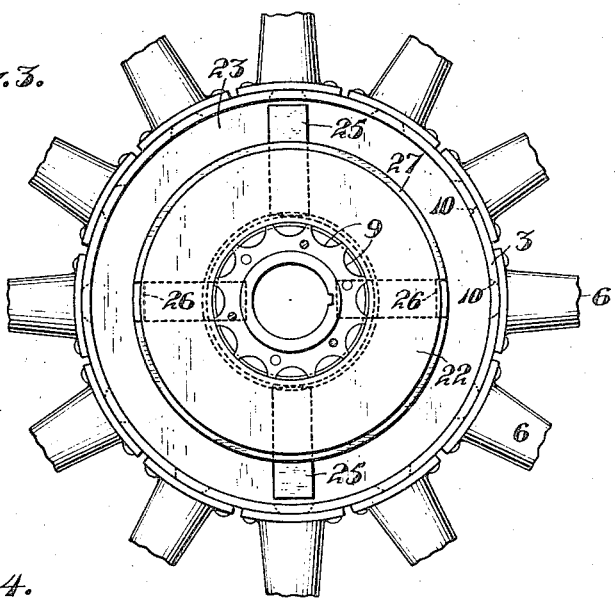
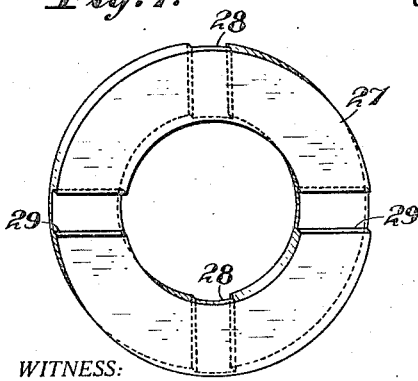
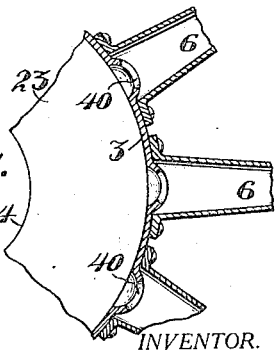
WITNESS:
F. C. Fliedner
J. C. Benesch
INVENTOR.
James C. Haughy,
BY Strong & Townsend
ATTORNEYS.

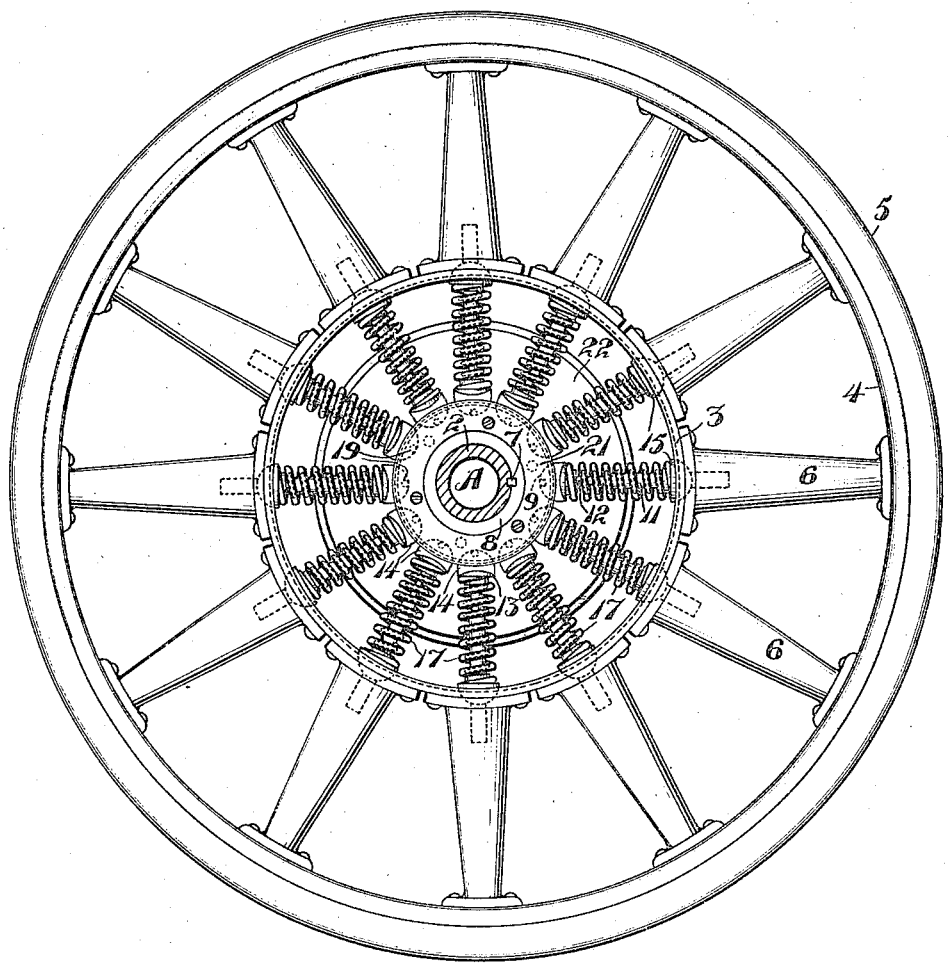

UNITED STATES PATENT OFFICE.

JAMES C. HAUGHY, OF SAN FRANCISCO, CALIFORNIA.

SPRING-WHEEL.

1,283,407.  Specification of Letters Patent.  Patented Oct. 29, 1918.

Application filed August 1, 1917. Serial No. 183,887.

*To all whom it may concern:*

Be it known that I, JAMES C. HAUGHY, a citizen of the United States, residing in the city and county of San Francisco and State of California, have invented new and useful Improvements in Spring-Wheels, of which the following is a specification.

This invention relates to a spring wheel and particularly to improvements on the structure shown in Patent No. 1,051,517, issued to L. L. Rogers, January 28th, 1913, entitled "Vehicle wheel".

One of the objects of the present invention is to provide a simple, substantial telescoping guiding and supporting spoke for each spring interposed between the hub and inner rim of the wheel and in conjunction therewith to provide means for retaining said spokes against accidental displacement when subjected to abnormal shocks, strains or breakage. Another object of the invention is to provide a positive driving coupling between the hub and the rim of the wheel, which will permit a free radial movement of the rim in any direction with relation to the hub, and also to provide a housing for inclosing the telescoping spokes, springs and the coupling, as will hereinafter be more fully described. Further objects will hereinafter appear.

The invention consists of the parts and the construction and combination of parts as hereinafter more fully described and claimed, having reference to the accompanying drawings, in which—

Figure 1 is a side elevation of the wheel showing the front cover removed.

Fig. 2 is a detail transverse section through the wheel.

Fig. 3 is a side elevation of the inner rim and hub, showing the telescoping spokes and springs removed to expose the driving coupling.

Fig. 4 is a perspective view of the intermediate member of the driving coupling.

Fig. 5 is a detail section, showing a modified form of the inner rim.

Referring to the drawings in detail, A indicates an axle spindle, 2 a hub member adapted to freely turn on the spindle, 3 an inner rim resiliently supported with relation to the hub, as will hereinafter be described, 4 an outer rim and 5 a suitable form of tire carried by said rim.

Rigidly securing the inner rim in a concentric position with relation to the outer rim is a plurality of hollow metal spokes 6, and rigidly secured to the hub member, by a key 7, is a collar 8 in which is formed a plurality of semi-cylindrical seats 9. Formed in the inner rim, in central alinement with each hollow spoke 6, is a socket-shaped seat 10, and interposed between each pair of seats 9 and 10 is a telescoping spoke member which consists of a tubular section 11 and a rod-shaped section 12.

Formed on the inner end of the rod section is a head member consisting of a collar 13 and a bearing section 14 which is adapted to fit the seat 9, and formed near the outer end of the tubular section on the spoke and formed integral therewith or otherwise secured is a spherical-shaped bearing member 15 which is adapted to engage the seat 10. The seats 9 are in direct alinement with the spokes and the seats 10 and the number of telescoping spokes employed depends entirely upon the size of the wheel constructed and the number of rigid spokes 6 employed.

Interposed between the collar formed on each tubular spoke section and below the spherical bearing members 15 and the collars 13 formed on the rod sections of the spokes is a flexible housing consisting of a comparatively light coil spring 16, and surrounding said spring is a second comparatively heavy supporting spring 17. The spring 17 surrounding each spoke forms a resilient support between the inner rim and the hub of the wheel and, therefore, permits a free radial movement of the hub with relation to the inner rim when the load is applied or when undulations in the road surface are encountered, that is, the axle and spindle supporting the hub remains, comparatively speaking, stationary while the wheel proper assumes an eccentric position with relation to said members when operating.

The wheel constructed as here shown may be employed as a driving wheel or as a front wheel. The structure employed in each instance is comparatively similar, with the exception that the hub is free to revolve about the spindle in one instance while it is keyed or otherwise locked to the shaft when employed as a driving wheel. Again, it is possible to drive the wheel by applying a sprocket or any other similar connection.

One of the important features of the spoke structure shown is the provision of means for preventing any spoke from accidental displacement with relation to the inner or outer seats between which they are interposed whether the spokes are subjected to abnormal shocks, strains or breakage. This can readily be appreciated when it is observed that the bearing member 14 of each spoke section is provided with an inwardly extending pin 19. This pin engages with a pocket formed in the hub of the driving coupling shown at 20. Displacement of the inner end of the spokes with relation to their seats, due to shock or vibration, cannot possibly take place where pins of the character described are employed as the outward movement of each spoke is positively limited by the pins and the pockets retaining same. Similarly, displacement laterally is avoided by means of a bearing disk 21. Displacement of the outer ends of the spokes with relation to their seats is also avoided as the projecting ends of the tubular sections of the spokes are made so long that they extend a considerable distance up into the hollow spokes, thus serving as guides and insuring a positive return of the bearing members 15 with relation to their seats if they should become displaced.

Breakage of either the rod or tubular section of each individual spoke is taken care of by the flexible housing or coil spring 16, that is, the broken parts, if breakage should take place, will be inclosed or housed in by said spring and are thereby prevented from falling out and interfering with the operation of any other part of the mechanism. Each spoke member is, therefore, not only guarded against accidental removal with relation to the inner and outer seats but is also so inclosed that broken parts cannot possibly become free or disarranged to such an extent as to interfere with the operation of any other spoke or the coupling 20. Telescoping of any spoke is also taken care of by the inner springs or flexible housings 16, if one of the outer springs should happen to break, as the tension of said inner springs is sufficient to always maintain each spoke in extended position or in engagement with its respective bearing seats.

Formed as an integral part of the inner rim 3, is a rear housing section 23, in which is formed a comparatively large central opening 24, through which the hub 2 extends and in which it is permitted to freely move in any radial direction. Secured on the inner face of the housing section 23 is a pair of opposed, radially disposed key members 25, and secured on the hub, by means of the key 7, is a disk 22, on the inner face of which is secured a pair of key members 26. These keys are oppositely disposed with relation to each other and at the same time are positioned at right angles to the keys 25. Positioned intermediately of the housing 23 and the disk 22 is a coupling ring 27, and formed in each side of said ring are keyways 28 and 29; the keyways 28 being formed for the reception of the keys 25 and the keyways 29 for the reception of the keys 26.

The coupling thus constructed forms a driving connection between the rim of the wheel and the hub. This form of coupling is known in general practice as the "Oldham" coupling and is generally employed where radial or eccentric movement of two alined driving members is desired.

The housing 23 and disk 22 are in reality splined with relation to the intermediate disk 27 and, therefore, form a positive driving connection between the hub and the wheel in a circumferential direction, but at the same time permit a freedom of movement eccentrically or radially of the wheel with relation to the hub. The inner rim 3 and the rear housing section 23 formed integral therewith forms an annular cover or housing member not only for the coupling shown but also for the hub, the telescoping spokes and the springs surrounding same. The housing may, therefore, be filled with grease or any other suitable lubricant which is permitted to lubricate all the moving parts, said grease being prevented from escaping by providing a removable front cover 30 and an inner plate 31, which is secured on the hub exteriorly of the housing 23.

The only sliding faces presented are formed between the housing 23 and the disk 31 and as these are held in comparatively tight contact with relation to each other by means of a hub cap 32, it can readily be seen that comparatively little leakage, if any, can take place as a heavy grease is preferably employed. Packing rings of any suitable description may, of course, be interposed between the sliding faces 23 and 31, if desired, but actual practice has demonstrated that this in most instances is unnecessary.

The materials and finish of the several parts comprising the wheels and also including the tire 5 may be such as the experience and judgment of the manufacturer may dictate.

A modified form of the rim structure shown in Fig. 2 is shown in Fig. 5. The seats 10 are here pressed from the metal body of the rim to increase the bearing surface and the inner end of each pocket or seat thus formed is slotted, as at 40, to permit the tubular end of the spoke section to project through.

I wish it understood that various changes in the construction and arrangement of the several parts herein shown and described may be made without departing from the spirit of my invention as disclosed in the appended claims.

Having thus described my invention, what I claim and desire to secure by Letters Patent is—

1. A vehicle wheel having in combination a series of hollow spokes, an inner and an outer rim secured by said spokes, a hub member interiorly of the inner rim, radially disposed, telescoping spokes interposed between the inner rim and hub, a bearing member on each end of the telescoping spokes, alined seats in the inner rim and the hub for the reception of said bearing members, the seats in the rim being in alinement with the hollow spokes, a pin on each inner bearing member adapted to secure it against accidental removal with its seat in the hub, an extension on each outer bearing member extending into each hollow spoke adapted to guide the outer bearing members and secure the same against displacement with relation to their respective seats in the rim, and a coil spring on each telescoping spoke interposed between the bearing members.

2. A vehicle wheel comprising a hub and a rim, a plurality of radially disposed telescoping spokes interposed between the rim and hub, a bearing member on each end of each spoke, alined seats in the rim and hub for the reception of the bearing members, a recess formed in one side of each hub seat, a pin on each inner bearing member projecting into said recesses to secure said bearing members against removal with relation to their respective seats in the hub, means on the outer bearing members for maintaining the same in alinement with their respective seats in the rim, and a pair of coil springs on each spoke interposed between the bearing members.

3. A vehicle wheel comprising a hub and a rim, a plurality of radially disposed telescoping spokes interposed between the rim and hub, a bearing member on each end of each spoke, alined seats in the rim and hub for the reception of the bearing members, a recess formed in one side of each hub seat, a pin on each inner bearing member projecting into said recesses to secure said bearing members against removal with relation to their respective seats in the hub, means on the outer bearing members for maintaining the same in alinement with their respective seats in the rim, a pair of coil springs on each spoke interposed between the bearing members, and means on each inner bearing member for maintaining the outer bearing members in alinement with respective seats in the rim.

4. A vehicle wheel comprising a hub and a rim, a plurality of radially disposed telescoping spokes interposed between the rim and hub, said spokes each comprising an outer tubular member and an inner rod-like member slidably mounted in the tubular member, a socket-shaped, perforated bearing near the outer end of each tube, a bearing member on the inner end of each rod, alined seats in the rim and hub for the reception of the bearing members, the seats in the rim being socket-shaped and perforated to receive the tube bearings and said rod members being sufficiently long to extend through the perforated tube bearings and the perforated seats in the rim to hold the tube bearings in alinement with the rim seats, means on each bearing member for securing same against endwise removal with relation to the hub seats, and a coil spring surrounding each rod and tube member and interposed between the bearing members.

5. A vehicle wheel comprising a hub and a rim, a plurality of radially disposed telescoping spokes interposed between the rim and hub, said spokes each comprising an outer tubular member and an inner rod-like member slidably mounted in the tubular member, a socket-shaped, perforated bearing near the outer end of each tube, a bearing member on the inner end of each rod, alined seats in the rim and hub for the reception of the bearing members, the seats in the rim being socket-shaped and perforated to receive the tube bearings and said rod members being sufficiently long to extend through the perforated tube bearings and the perforated seats in the rim to hold the tube bearings in alinement with the rim seats, means on each bearing member for securing same against endwise removal with relation to the hub seats, said means comprising a pin on one side of each inner bearing member and a recess formed in one side of each coöperating hub seat into which said pins project, and a coil spring surrounding each rod and tube member and interposed between the bearing members.

In testimony whereof I have hereunto set my hand in the presence of two subscribing witnesses.

JAMES C. HAUGHY.

Witnesses:
JOHN H. HERRING,
D. B. RICHARDS.

Copies of this patent may be obtained for five cents each, by addressing the "Commissioner of Patents, Washington, D. C."